United States Patent [19]
Fawcett

[11] 3,927,580
[45] Dec. 23, 1975

[54] DISENGAGING CLUTCH SYSTEMS FOR A THREE-SPEED WINCH

[75] Inventor: Derek James Fawcett, Havant, England

[73] Assignee: Lewmar Marine Limited, Havant, England

[22] Filed: Nov. 6, 1973

[21] Appl. No.: 413,254

Related U.S. Application Data

[63] Continuation-in-part of Ser. No. 267,948, June 30, 1972, abandoned.

[30] Foreign Application Priority Data
July 2, 1971    United Kingdom............... 31197/71

[52] U.S. Cl................................ 74/812; 254/150 R
[51] Int. Cl.²....................... F16H 5/52; B66D 1/30
[58] Field of Search............ 74/810, 812; 254/150 R

[56] References Cited
UNITED STATES PATENTS

| | | | |
|---|---|---|---|
| 1,608,978 | 11/1926 | Gilman............................ | 254/150 R |
| 3,145,974 | 8/1964 | Short............................... | 254/150 R |
| 3,656,596 | 4/1972 | Morgan....................... | 254/150 R X |
| 3,670,589 | 6/1972 | Carter.......................... | 254/150 R X |
| 3,712,155 | 1/1973 | Stommel et al...................... | 74/810 |
| 3,728,914 | 4/1973 | Guangorena et al. ................. | 74/812 |
| 3,802,665 | 4/1974 | Fawcett ........................... | 74/812 X |
| 3,809,368 | 5/1974 | Lawrence ......................... | 74/812 X |

FOREIGN PATENTS OR APPLICATIONS

| 98,676 | 11/1952 | U.S.S.R................................. | 74/812 |
|---|---|---|---|

Primary Examiner—Samuel Scott
Assistant Examiner—Lance W. Chandler
Attorney, Agent, or Firm—Bacon & Thomas

[57] ABSTRACT

A three speed manually operable sheet winch for use on sailing crafts, and having an automatically disengaging clutch system for an ancillary reduction gear arrangement, placed between a drive shaft and the final drive to the drum.

In a first embodiment the winch has a main reduction gear box which incorporates two gear trains of different gear ratio and one having one more gear stage than the other. The gear ratios in the main gear box and the ancillary reduction gear arrangement are such that three reduction gear ratios are obtained upon two reversals of the direction of rotation of the drive shaft.

In a second embodiment the winch has successive drive ratios engaged by successively opposite rotations of a drive shaft. The ratios are a 1:1 direct drive and two reduction drive ratios constituted by gear trains. There is automatic clutch which disengages the direct drive on engagement of the second ratio. Between the driven side of the clutch and the drum, in both embodiments, there is a unidirectional drive device which prevents the driven side being driven by the drum if the latter overruns.

12 Claims, 7 Drawing Figures

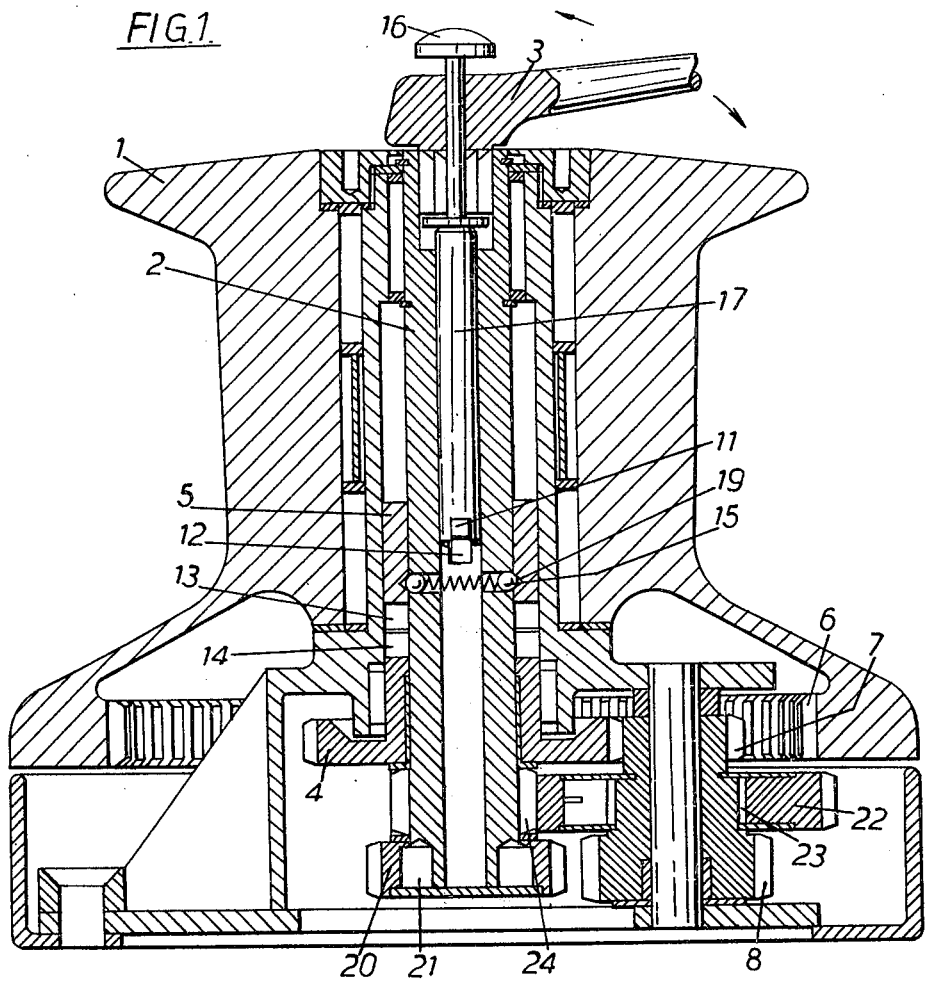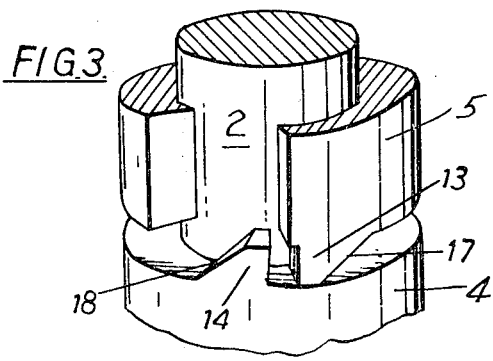

3,927,580

DISENGAGING CLUTCH SYSTEMS FOR A THREE-SPEED WINCH

This is a continuation-in-part of my application No. 267,948 filed June 30, 1972.

BACKGROUND OF THE INVENTION

The invention relates to mannually operable sheet winches for controlling sheets of sailing craft in which the gear ratio between a crank handle and a winch drum may be increased in three successive stages during the winch operating cycle. In particular the invention relates to means for changing the gear ratio during the operating cycle.

Known winches suffer from one of two defects, namely either the gear change is complicated and time consuming, or else it is so simple that one of the gears can slip out of engagement whenever pressure is taken off the crank handle.

SUMMARY OF THE INVENTION

The invention provides a drive mechanism for a three speed winch, and having a drive shaft with means to accept manual drive, and a main reduction gear box which incorporates two gear trains of different gear ratio and one having one more gear stage than the other, which are operable by rotation of the drive shaft in either direction respectively, and in which there is an ancillary reduction gear arrangement operable through a clutch which is arranged to disengage automatically when the direction or rotation of the drive shaft is reversed in one sense.

Preferably the clutch is engageable by a push down linkage extending through the drive shaft.

Preferably the clutch is thrown out of engagement by chamfered faces on teeth which, when rotating in the operable sense, constitute the drive means between the drive shaft and the ancillary reduction gear.

Preferably the clutch is held out of engagement when not required by spring urged balls arranged to move into an internal groove on a part of one of the clutch members surrounding the drive shaft.

Preferably the ancillary reduction gear surrounds the drive shaft, and is supported by the main reduction gear box.

The invention includes a three speed winch incorporating a drive mechanism according to the invention described above.

DESCRIPTION OF THE DRAWINGS

FIG. 1 is a cross sectional view of the complete transmission system of a winch on the line 1:1, in FIG. 2, FIG. 3 is a perspective cut-away view of the clutch members.

Figure 2:
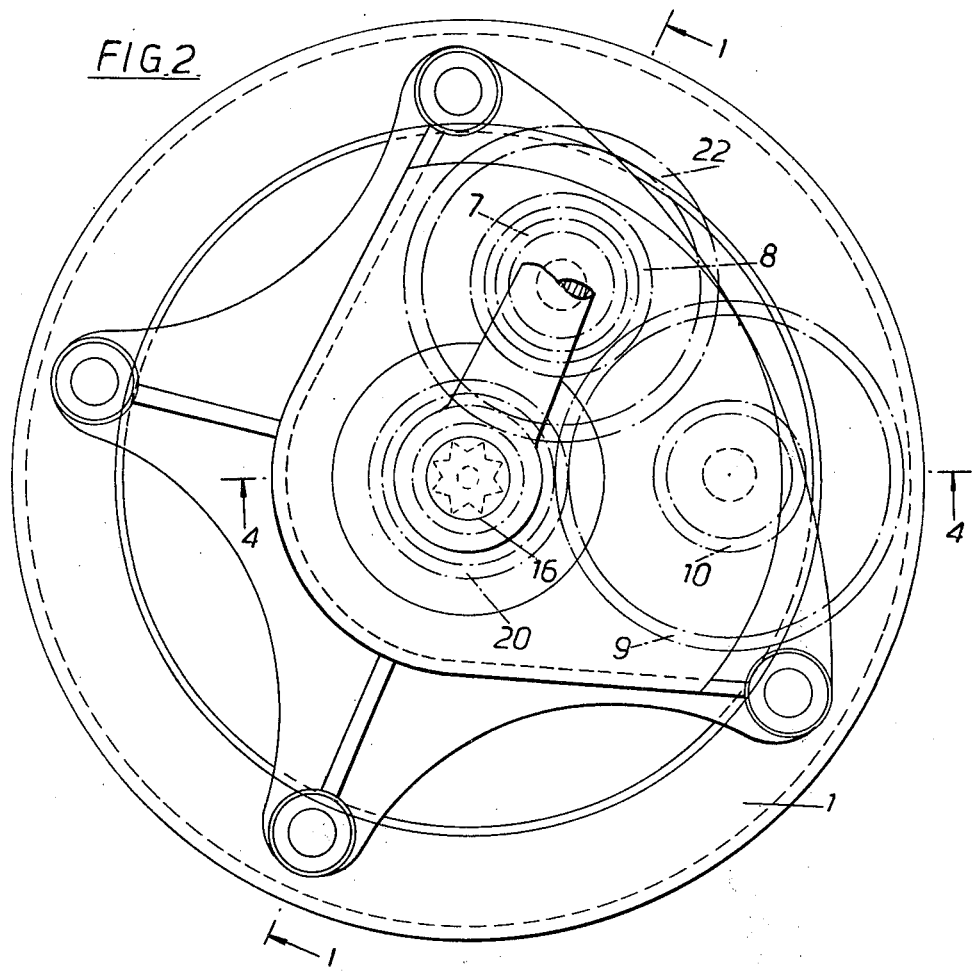
FIG. 2 is a ghost plan view of the winch gear box.
Figure 4:
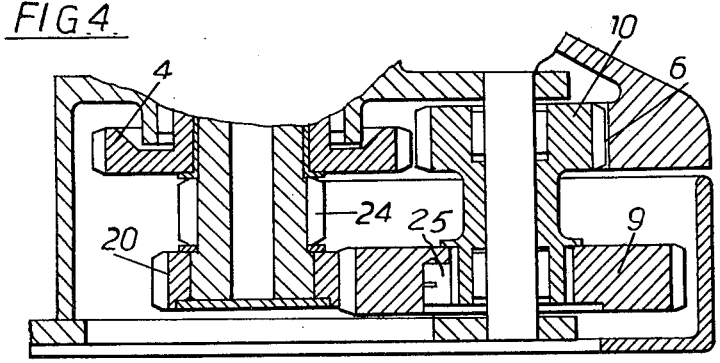
FIG. 4 is a partial section on the line 4:4 in FIG. 2

A winch drum 1 surrounds a spindle 2 rotatable therein. An operating handle 3 is socketed into the spindle which may be arranged to drive a gear 4 via a sliding clutch member 5. The gear 4 is arranged to drive an internal gear 6 which is integral with the drum via gears 7,8,9 and 10. The clutch member 5 is free to slide axially on the spindle 2 but is prevented from rotating by means of a squared rod 11 which passes through square holes placed diametrically opposite each other in clutch member 5 and through axially elongated holes 12 in the spindle. The clutch is shown in the disengaged position, the complementary clutch teeth 13 and 14 being held apart by means of a ball and spring detent assembly 15 which in the configuration illustrated holds up the component carrying the tooth 13.

To operate the winch in first gear a push button 16 mounted centrally in the hub of the operating handle is depressed. This action moves the clutch member 5 axially downwards into engagement with clutch teeth 14 which are integral with gear 4. The downward movement is transmitted via a push rod bearing upon the square rod 11 which is attached to the sliding clutch member. The gear 4 is thus locked to the shaft and drives the drum via the gear train defined above when the operating handle is rotated. The drum thus rotates at a slower speed relative to the operating handle.

To operate the winch in second gear the direction of rotation of the operating handle is reversed. The teeth on clutch member 5 and gear 4 thus separate circumferentially until helically sloping reverse faces 17 and 18 on teeth 13 and 14 respectively (FIG. 3) are driven into contact. At this point clutch member 5 is driven axially out of engagement with gear 4 by the screw action between faces 17 and 18. At the point at which the clutch teeth 13 and 14 just screw out of engagement the spring loaded balls 15 start to enter the sloping faces of a detent groove 19. The balls then spring radially outwards and push the clutch member 5 clear of the mating clutch teeth on gear 4. The winch drum continues to rotate in the same direction but at a slower speed being driven by the first reduction gear train 20, 9 and 10 of the main reduction gear system. The gear 20 locks to the spindle 2 by means of a ratchet system 21 while gear 22 which can lock to gears 7 and 8 via a ratchet system 23 rotates backwards in the unlock direction of the ratchet 23.

To operate the winch with the third speed engaged the operating handle is again reversed but since the clutch has previously disengaged the drum continues to be driven in the same direction but at a still slower speed relative to that of the operating handle via gears 24,22,8,9 and 10. In this direction the ratchet system 23 locks gear 22 to gear 8 while ratchet system 21 allows gear 20 to disengage from the spindle 2.

In this embodiment the unidirectional drive means 25 in gear 9 (common to the highest drive ratio and the two others) which disconnects drive by the drum if the latter tends to overrun, to prevent unwanted disengagement of the clutch.

Figure 5:
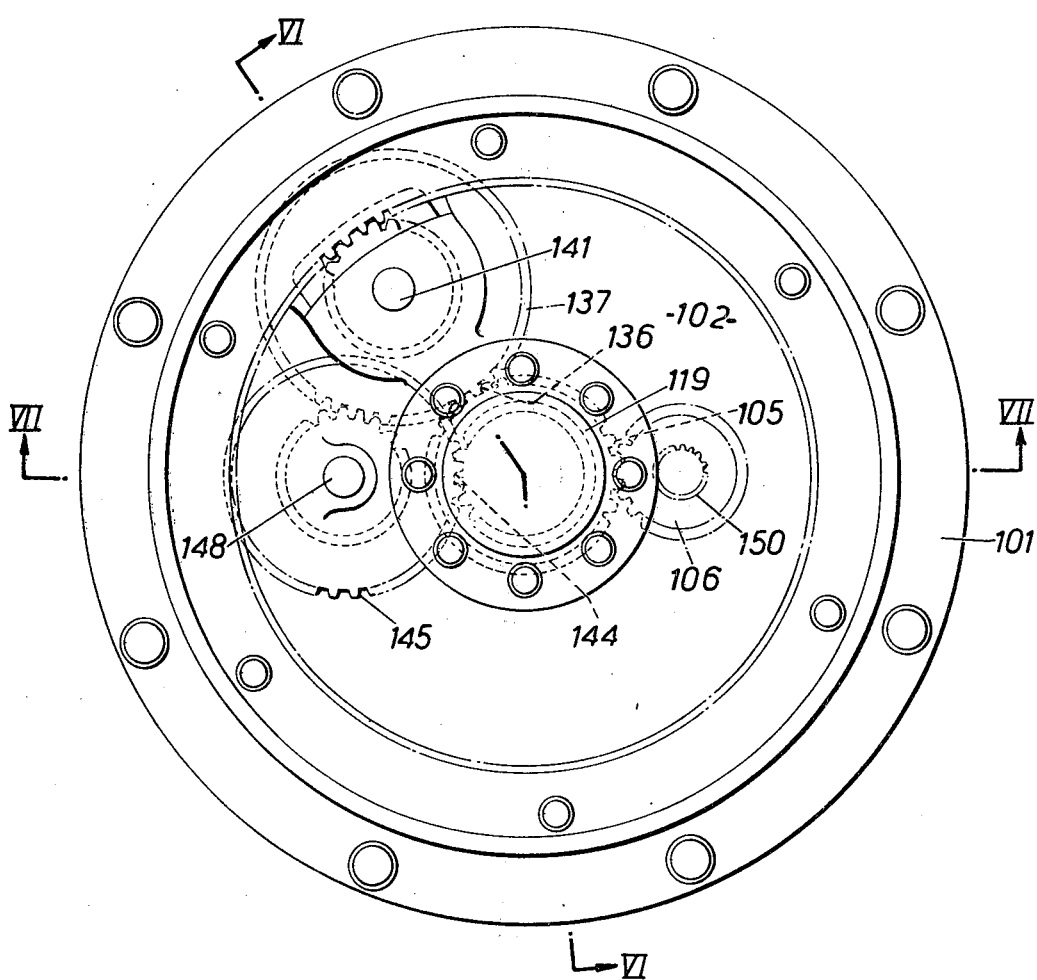
FIG. 5 is a plan view of a second embodiment.
Figure 7:
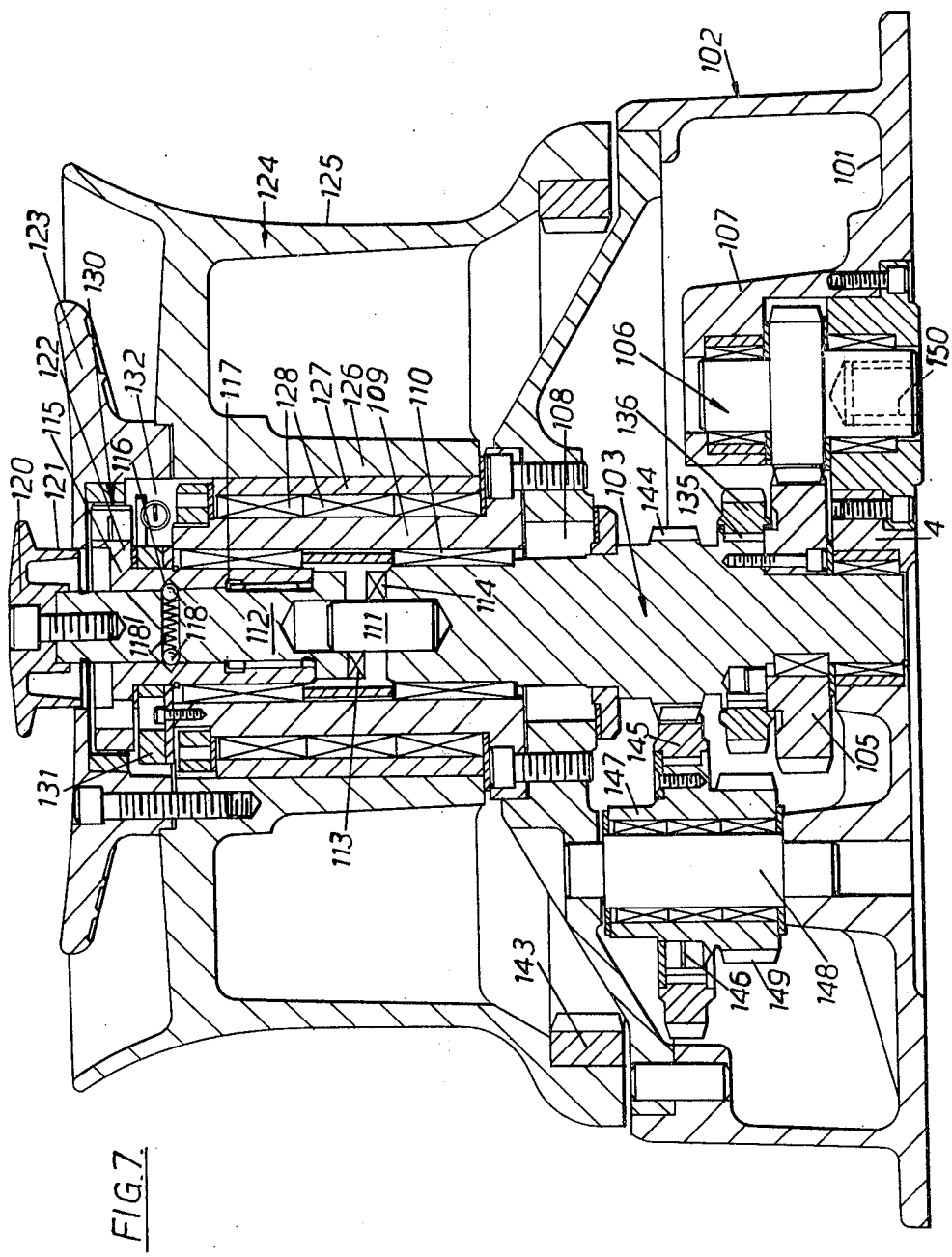
FIG. 7 is a sectional elevation on the line VII:VII of FIG. 5.

In the second embodiment of winch which is shown in FIGS. 5 and 7 there are three drive ratios available but in this case the highest drive ratio i.e. the one with the lowest mechanical advantage from the drive shaft to the drum is a direct 1:1 drive and there are two successive reduction ratios constituted by drive gear trains having successively an odd and an even number of intermeshings. Thus successive rotations of the drive shaft in opposite directions at one speed can, through the respective direct drive and reduction gear trains, cause rotation of the drum in a single sense at successively reducing speeds.

In this winch there is a base plate 101 which has a casing 102 raised upon it and the base plate has a bearing 104 for a main shaft 103 which defines a central axis of the winch and which is the central drive shaft. At the bottom end of the shaft 103 and immediately above its bearings 104 in the base plate 101 is keyed and bolted a gear 105 which meshes with a drive input pinion and stub shaft 106 which is borne in a bearing housing 107 on the base plate 101. Input drive to the gear and shaft 106 derives from a separate bevel gear box mounted underneath the bearing housing 107. The bevel gear box protrudes through an opening cut into the deck upon which the winch is mounted and has an externally splined output shaft which engages with the internal spline 150 in the stub shaft 106.

The top of the drive shaft 103 projects upwardly through a collar 108 to within a cylindrical sleeve 119 bolted to the head of the casing 102 wherein it is concentrically supported by rolling contact bearings 110 and is spigoted by spigot 111 to a clutch shaft 112 arranged coaxially above the shaft 103. At the foot of the clutch shaft 112 is a cam face 113 engageable with a cam face 114 at the top of shaft 103 these faces having upwardly inclined surfaces behind them, exactly as illustrated with reference to the first embodiment in FIG. 3.

The shaft 112 is axially moveable between a position where the faces 113 and 114 do not interfere with each other (as shown) to a position, downwardly from that, where the faces 113, 114 meet each other so that drive communicated in the appropriate direction by shaft 103 is communicated through those faces to clutch shaft 112. The axial movement of the shaft 112 is within a direct drive sleeve 115 to which it is splined and in which are provided a bevelled annular groove 116 and bevelled annular face 117 which can be engaged respectively in the upper and lower position of the shaft 112 by balls 118 which are urged mutually outwardly by spring 118' so that the shaft is preferentially retained in either the upper or lower position. It is driven to the lower position by manual pressure applied from above through a control knob 120 bolted to the head of the shaft and the knob 120 has a downwardly depending sleeve 121 which fits within an upstanding wall of a cup portion 122 at the head of the sleeve 115 and within a cut out at the centre of a manual operating wheel 123 bolted to the upper face of the winch drum 124.

The drum 124 is of hollow construction with an outer slightly dished cylindrical wall for the reception of the sheet to be wound on the drum and an inner cylindrical wall 126 within which is a liner 127 and rolling bearings 128 engaging the outer face of the cylinder 119. Drive from the driven side 113 of the clutch through the clutch shaft 112 and sleeve 115 is communicated to the drum through a unidirectional drive device comprising a pawl and ratchet race 130 positioned with its outer race within the hollow of the wheel 123 and its inner race on the outer wall of the cup of the sleeve 115. The pawls may be on either the inner or outer race, the ratchets being on the outer race.

Figure 6:
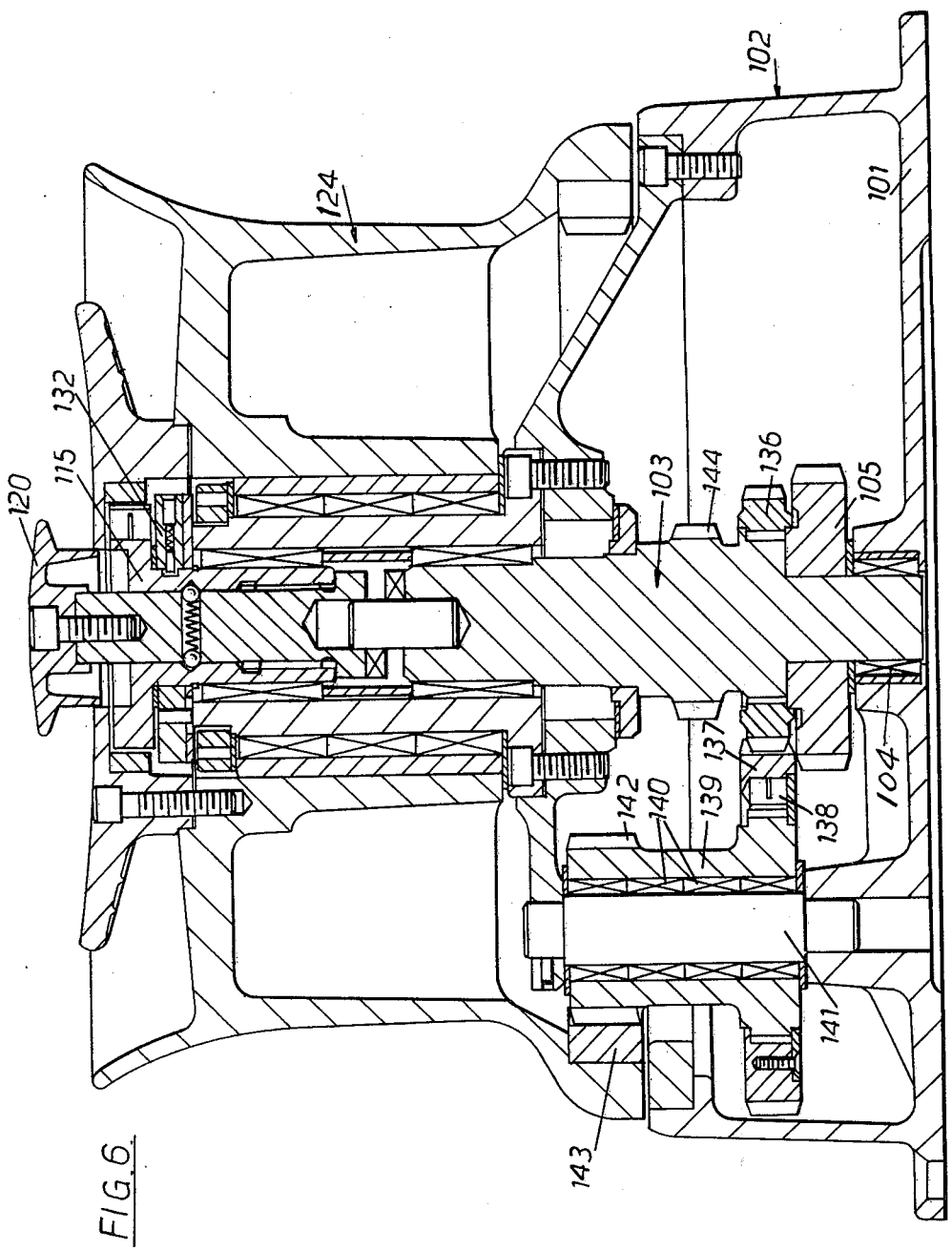
FIG. 6 is a sectional elevation on the line VI:VI of FIG. 5.

Below the cup 122 a stationary ring 131 secured to the head of the cylinder 119 has a non-return element 132 engaging the sleeve 115 (FIG. 6) to prevent reverse drive of the sleeve.

This arrangement is such that drive from the shaft 112 when the driving face 114 and cam face 113 of the clutch are engaged can be positively communicated from the shaft 112 through the sleeve 115 of the pawl and ratchet race 130 to the drum but then if the drum tends to overrun this drive and would tend to drive the driven member 113 past the driving one 114 this overrun is disconnected by that unidirectional drive device 130 so that this overdriving in the clutch does not occur. Merely frictional drag in the race 130 may tend to reverse the rotation of the shaft 112, but this reverse rotation is prevented by the non-return device 132. It is apparent that without the disconnection by the pawl and ratchet 130, overdriving in the clutch would occur and automatic disengagement would follow. Thus, automatic disengagement only occurs when the drive shaft rotates in one direction relative to the static body of the drum (made up by, inter alia, base plate 101 and casing 102).

The arrangement of the two reduction gear trains will now be described briefly; in the first reduction gear train (second drive ratio) a gear 136 is coupled to shaft 103 through a unidirectional drive device 135 (such as a pawl and ratchet race or a sprag clutch) which meshes with a gear ring 137 mounted, through a unidirectional device 138, on a gear sleeve 139 borne through rolling contact bearings 140 on a shaft 141. This is supported between the base plate 101 and the head of the casing 102. At the upper end of the gear sleeve 139 are integral gear teeth 142 which continuously mesh with an endless internal ring gear 143 within the base of the cylindrical wall of the winch drum 124.

The second reduction gear train (third drive ratio) is formed by the gear teeth 144 in the shaft 103 engaging with teeth 145 connected through a unidirectional drive device 146 to a gear sleeve 147 borne on a shaft 148 also secured between the base plate 101 and the head of the casing 102. The sleeve 147 has integral with it gear teeth 149 which are engaged at all times with gear ring 137. It can be seen that there are formed two gear trains communicating from the shaft 103 to the ring gear 143 one consisting of gear ring 136 and gear ring 137 and gear 142 the other of gears 144,145,149,137 and 142. The unidirectional devices 135 and 146 are set in opposite directions relative to the drum so that rotation of the drive shaft 103 in successively opposite direction drives the drum through only one of the trains while the unidirectional drive in the other of the trains overruns. However back-running of the drum is prevented because the drum tends to drive the opposed unidirectional devices against each other, and overrunning of the drum is disconnected in the gear trains by unidirectional device 138.

The operation of the automatic disengagement of the clutch on engagement of the second of the three drive ratios is very similar to that described in the previous embodiment. With the knob 120 depressed the driving face 114 and driven face 113 engage. Drive is communicated in 1:1 direct manner. When the drive shaft 103 is reversed in its rotation, the driving element 114 reverses direction of action so that in effect the driven face 113 overtakes the driving member 114 and the sloped camming surfaces engage and ride over each other to force the clutch elements axially apart. This overtaking is ensured because reverse rotation of the sleeve 115 and hence of the clutch shaft 112 is prevented by engagement with the stationary non-return device 132 on the ring element 131. Rotation of the shaft in that direction communicates drive through the first (136,137,142,143) of the two gear trains while the unidirectional device (146) in the other is disengaged and then rotation of the drive shaft 103 once more in the original direction, the direct drive elements 130 being disengaged by the disengagement of the clutch drive will be communicated to the drum through the third drive ratio i.e. the second reduction gear train (144,145,149,137, 142,143). As mentioned, overrunning of the drum through the gear trains is permitted by the arrangement of the unidirectional device 138; this is the situation (from the point of view of those gear trains) when the direct 1:1 drive is engaged as well as when the drum is overrunning even the direct drive.

I claim:

1. A winch in which there are more than two drive trains between a drive shaft and the winch drum offering respectively different drive ratios of drive of the drum in one sense of rotation, at least one of the driving trains having a disconnectable drive means, the ratios being successively engageable by successively opposite directions of rotation of the drive shaft, a preselector operable to determine which one of two of the said drive ratios engageable upon a given said direction of rotation of the drive shaft will be engaged, the preselector being thus operable by causing connection or disconnection of the disconnectable drive means in one of the said drive trains, and means automatically to disconnect the disconnectable drive means only upon reversal of the drive shaft from the given said direction of rotation.

2. A multispeed winch having a static body, a drum, bearing means supporting the drum on the body for rotation about an axis of rotation, a drive shaft, bearing means supporting the drive shaft in the body for rotation about the same axis of rotation, a plurality of drive linkages between the shaft and the drum operable to drive the drum in a single sense of rotation at different speeds upon successive rotation of the drive shaft at the same speed in successively opposite senses of rotation, one of the drive linkages including a manually engageable coupling means having engageable driving and driven members whose engagement constitutes engagement of the coupling, in which condition the driving member is arranged to drive the driven member unidirectionally in a driving sense of rotation upon relative rotation of the driving and driven members in one direction of rotation, the driving member, at least when the coupling means is engaged being operatively connected to the drive shaft for rotation when the drive shaft rotates in either sense, and means for automatically disengaging the coupling only when the drive shaft rotates in one sense of rotation relative to the static body of the winch, the drive linkage in at least the highest of the drive ratios including a unidirectional drive means oriented to prevent relative rotation of the driving and driven members in the sense opposite to the said one direction of rotation by the drum through that linkage.

3. A multispeed winch having a drive shaft and a drum, and a plurality of drive linkages between the shaft and the drum operable to drive the drum in a single sense of rotation at different speeds upon successive rotation of the drive shaft at the same speed in successively opposite senses of rotation, one of the drive linkages including a manually engageable clutch means having engageable driving and driven members whose engagement constitutes engagement of the clutch means, in which condition the driving member is arranged to drive the driven member uni-directionally in a driving sense of rotation, the driving member, at least when the clutch means is engaged, being operatively connected to the drive shaft for rotation when the drive shaft rotates in either sense, the driving and driven members being adapted automatically to disengage if the driven member relatively overtakes the driving member in the said driving sense of rotation, the driven member when driven in the said driving sense of rotation driving the drum through uni-directional drive means which prevent the drum driving the said driven member in the said driving sense of rotation, there being means ensuring the said overtaking of the driving member by the driven member when the sense of rotation of the said driving member is reversed on reversal of the drive shaft, whereby on said reversal of the drive shaft when the clutch means is engaged, the driven member relatively overtakes the driving member in the said driving sense of rotation and the clutch means automatically disengages.

4. A multispeed winch according to claim 3 wherein said drive linkage including the clutch is the linkage having the lowest mechanical advantage between the drive shaft and the drum.

5. A multispeed winch according to claim 4 wherein said drive linkage including the clutch achieves a 1:1 drive between the shaft and the drum.

6. A multispeed winch according to claim 3 wherein said driving and driven members of the clutch are arranged for rotation about a common axis and are relatively axially movable for engagement and disengagement, the engaging axial movement being caused by manual movement of an operating button.

7. A multispeed winch according to claim 6 wherein the driving and driven members have teeth having front faces by the engagement of which drive is transmitted from the driving to the driven member in the driving sense of rotation when the clutch is engaged, and back faces forming cam surfaces which engage to cause disengaging relative axial movement of the driving and driven members when the driven member relatively overtakes the driving member in the driving sense of rotation.

8. A multispeed winch according to claim 6 including spring-biassed detent means to releasably hold the clutch in the disengaged state.

9. a multispeed winch according to claim 3 wherein the drive shaft, the drum and the driving and driven members of the clutch are arranged for rotation about a common axis, manually operable means for engaging the clutch being located on the said common axis at an axial end of the drum.

10. A multispeed winch according to claim 3 having a frame adapted to be fixed down at the mounting site of the winch and on which the drum and drive shaft are mounted for rotation, the said means to prevent reversal of the driven member of the clutch being ratchet means mounted on the frame and arranged to prevent rotation of the driven member in the sense opposite to the said driving sense of rotation.

11. A multispeed winch according to claim 3 wherein the driving member of the clutch is constituted by one end of the drive shaft and the driven member of the clutch is coaxial therewith.

12. A multispeed winch according to claim 3 wherein the said means to prevent reversal of the driven member of the clutch is a drive connection between the driven member and that one of said drive linkages between the drive shaft and the drum which is operative to drive the drum on the said reversal of the drive shaft.

* * * * *